United States Patent
Chikaraishi et al.

(10) Patent No.: US 7,204,167 B2
(45) Date of Patent: Apr. 17, 2007

(54) MOTOR-DRIVEN POWER STEERING APPARATUS

(75) Inventors: Kazuo Chikaraishi, Gunma (JP); Toshiyuki Onizuka, Gunma (JP); Shuji Endo, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/442,336

(22) Filed: May 30, 2006

(65) Prior Publication Data

US 2006/0213717 A1   Sep. 28, 2006

Related U.S. Application Data

(62) Division of application No. 10/519,485, filed as application No. PCT/JP03/05001 on Apr. 18, 2003, now abandoned.

(30) Foreign Application Priority Data

Jul. 3, 2002 (JP) ............... 2002-195042

(51) Int. Cl.
    *B62D 5/04* (2006.01)
(52) U.S. Cl. ............... 74/438; 180/444
(58) Field of Classification Search ............... 180/443, 180/444; 74/438
    See application file for complete search history.

(56) References Cited

U.S. PATENT DOCUMENTS

| | | | |
|---|---|---|---|
| 4,364,011 A | 12/1982 | Bloomfield et al. | |
| 5,003,836 A | 4/1991 | Mitsugu et al. | |
| 5,979,587 A | 11/1999 | Liubakka et al. | |
| 6,384,557 B1 | 5/2002 | Weber et al. | |
| 6,400,278 B1 | 6/2002 | Weyerstall et al. | |
| 2002/0035877 A1 | 3/2002 | Tokumoto | |
| 2005/0217923 A1 | 10/2005 | Onizuka et al. | |

FOREIGN PATENT DOCUMENTS

| | | |
|---|---|---|
| EP | 0 964 126 A2 | 12/1999 |
| EP | 1 362 766 A2 | 11/2003 |
| JP | 63-155009 U | 10/1988 |
| JP | 5-229445 A | 9/1993 |
| JP | 11-287637 A | 10/1999 |
| JP | 2001-287660 A | 10/2001 |
| JP | 2003-65753 A | 3/2003 |
| JP | 2003-329436 A | 11/2003 |
| WO | WO 2005/035332 A1 | 4/2005 |

*Primary Examiner*—Kevin Hurley
(74) *Attorney, Agent, or Firm*—Sughrue Mion, PLLC (57) ABSTRACT

The present invention relates to a motor-driven power steering apparatus structured such as to apply a steering assist force generated by a motor to a steering system of a motor vehicle or a vehicle in accordance with a rotation force of an electric motor on the basis of a steering torque detected by a torque sensor. Further, the invention relates to a rotation angle sensor for detecting a rotation angle of a steering shaft, a detected portion of the rotation angle sensor is provided within the speed reduction gear, and a detecting portion of the rotation angle sensor is provided in a radial direction of the steering shaft and in an outer side of a bearing in the speed reduction gear.

4 Claims, 7 Drawing Sheets

FIG. 1

PRIOR ART

MOTOR-DRIVEN POWER STEERING APPARATUS

This is a divisional application of U.S. Ser. No. 10/519,485, filed on Dec. 30, 2004 now abandoned, which is a National Stage Entry Application of PCT Application No. PCT/JP2003/005001 filed Apr. 18, 2003, which claims priority to Japanese 2002-195042, filed on Jul. 3, 2002. The entire disclosures of the prior applications, Ser. Nos. 10/519,485, PCT/JP2003/005001, and JP 2002-195042, are considered part of the present specification and are hereby incorporated by reference.

TECHNICAL FIELD

The present invention relates to a motor-driven power steering apparatus structured such as to apply a steering assist force generated by a motor to a steering system of a motor vehicle or a vehicle, and more particularly to a rotation angle sensor for detecting a rotation angle (a steering angle) of a steering shaft.

BACKGROUND ART

In order to reduce a fatigue of a driver and safely drive, a motor-driven power steering apparatus is generally mounted on the vehicle. The motor-driven power steering apparatus is structured such as to assist a load of the steering shaft and energize via a transmission mechanism such as a gear of a speed reduction gear or the like on the basis of a driving force of the motor.

Figure 1:
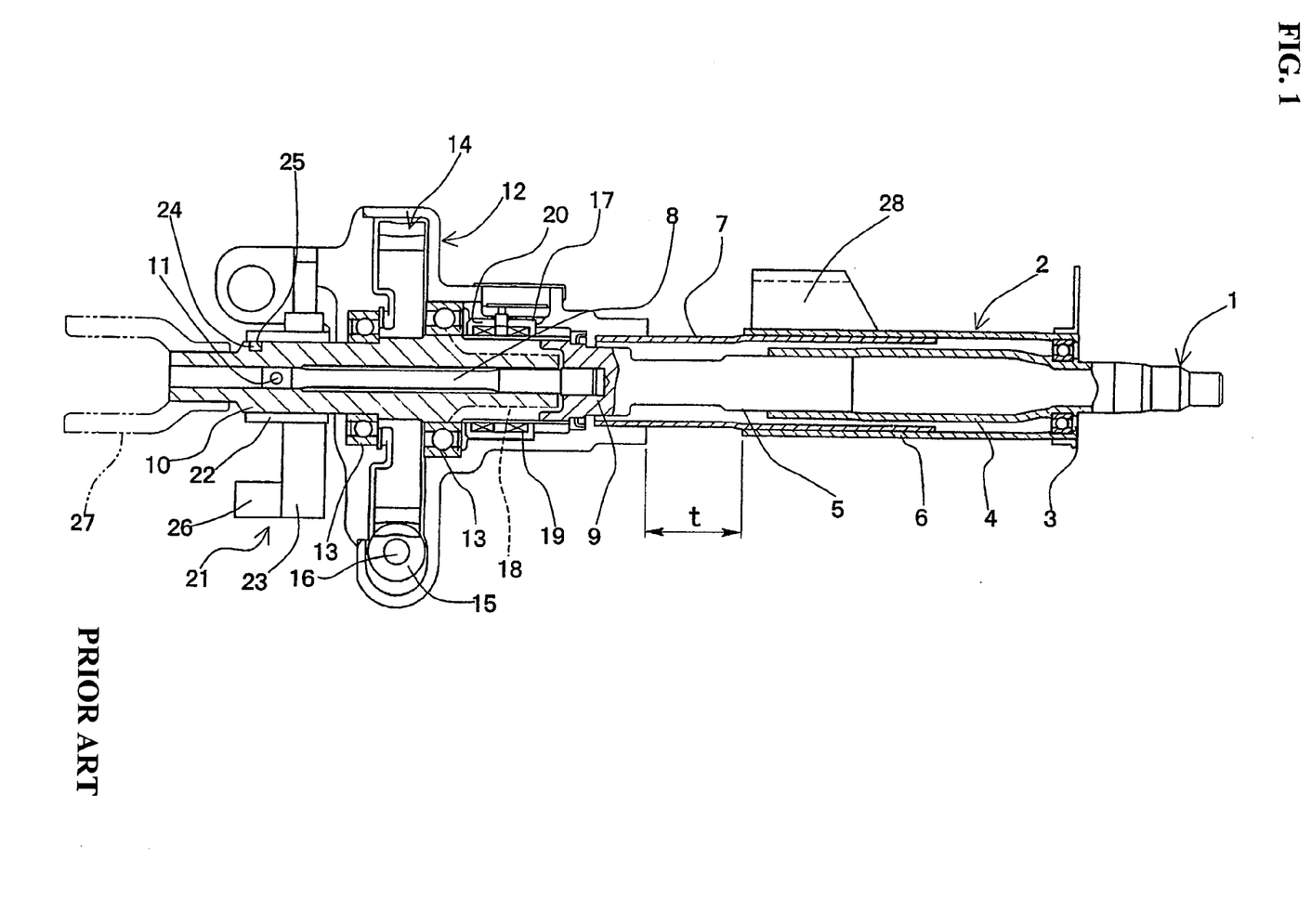
FIG. 1 is a cross sectional view showing an outline structure of a conventional motor-driven power steering apparatus.

As a conventional motor-driven power steering apparatus, an outline structure of the steering system is generally shown in FIG. 1. In the drawing, a steering shaft 1 having a steering wheel in a leading end (a right end in FIG. 1) is rotatably supported by a ball bearing 3 within a coaxial steering column 2, and is extended in an axial direction. The steering shaft 1 is constituted by a tubular outer shaft 4, and an inner shaft 5 fitted within the outer shaft 4. Further, the steering column 2 is formed by connecting a tubular outer column 6 and an inner column 7 press fitted and fixed within the outer column 6. Further, when an impact load is applied in a compression direction at a time of colliding, the outer shaft 4 and the outer column 6 are pressed into a base end side (a left side in FIG. 1), absorbs an energy by contracting an entire length and absorbs an impact applied to a body of the driver colliding with the steering wheel.

Further, an input shaft 9 and an approximately tubular output shaft 10 are connected to the base end side (the left side in FIG. 1) of the inner shaft 5 via a torsion bar 8. The torsion bar 8 is inserted into the output shaft 10, one end of the torsion bar 8 is press fitted and fixed to the input shaft 9, and the other end thereof is fixed to the output shaft 10 by a pin 11.

Further, a speed reduction gear unit 12 is supported to an outer periphery of a center portion of the output shaft 10 by a pair of ball bearings 13 and 13. The speed reduction gear unit 12 is constituted by a worm wheel 14 fixedly mounted to an outer periphery of the output shaft 10 in accordance with a press fitting, a worm 15 engaging with the worm wheel 14, and a motor in which the worm 15 is mounted to an output shaft 16, and is structured such as to reduce a speed of rotation of the motor via the worm 15 and the worm wheel 14 so as to transmit a torque, on the basis of driving the motor.

Further, a torque sensor 17 is arranged in a leading end side (a right side in FIG. 1) of the speed reduction gear unit 12, and the torque sensor 17 is provided with the torsion bar 8 and an electromagnetic yoke 20 receiving a coil winding 19 in an outer periphery of a spline groove 18 formed in a leading end of the output shaft 10, and is structured such as to detect a magnetic change by the coil winding 19 within the electromagnetic yoke 20, by generating a torsion angle in correspondence to a torque generated in the steering shaft 1.

Further, a rotation angle sensor (a steering sensor) 21 is arranged in a base end side (a left side in FIG. 1) of the speed reduction gear unit 12, and the rotation angle sensor 21 is constituted by a tubular hollow member 22 arranged in an outer periphery of the output shaft 10, and a casing 23 rotatably supporting the hollow member 22. In this case, in the hollow member 22, a projection 24 is extended to an inner side from an inner peripheral surface, and is engaged with a locking hole 25 provided in an outer peripheral surface of the output shaft 10, whereby the hollow member 22 is integrally rotated with the output shaft 10. Accordingly, the structure is made such as to detect the rotation angle of the output shaft 10 by detecting a relative displacement between the casing 23 and the hollow member 22 by a detecting means 26 provided in the casing 23. Accordingly, the steering state of the steering wheel is detected from the rotation angle (the steering angle).

In this case, reference numeral 27 denotes a universal joint for connecting to an intermediate shaft, and reference numeral 28 denotes a bracket for mounting the steering apparatus to the vehicle body.

In this case, in order to protect a passenger at a time when the vehicle is collided, it is necessary that an energy absorbing mechanism is provided in the steering column 2 for the regulation or the safety. Accordingly, in the conventional structure mentioned above, the steering shaft 1 and the steering column 2 are respectively constituted by two members (the outer shaft 4 and the inner shaft 5, and the outer column 6 and the inner column 7), and the outer shaft 4 and the outer column 6 can be moved at a certain range (a stroke t) in the axial direction at a time of collision. Therefore, the steering column 2 or the like is plastically deformed at a time of moving, and it is possible to absorb the energy generated at a time when the passenger collides with the steering wheel, on the basis of the deformation energy.

In this case, since the absorbing amount of the energy is determined by a product of a force applied by the impact and the stroke t, it is important to make the stroke t as long as possible in order to make the impact force to the passenger small so as to reduce an injury.

However, in the column type motor-driven power steering apparatus, it is necessary that the speed reduction gear and the torque sensor 17 are provided in the axial direction of the steering shaft 1, and it is necessary that the rotation angle sensor 21 is provided so as to have such a space that the steering shaft, that is, the output shaft 10 is exposed between the universal joint 27 and the speed reduction unit 12. Accordingly, the stroke t is limited to a fixed length from the space of the vehicle body, and there is a problem that it is hard to secure the stroke t of the energy absorbing mechanism to a sufficient length in the limited space.

Accordingly, an object of the present invention is to provide a motor-driven power steering apparatus in which a rotation angle sensor can be attached to a steering shaft in the limited space without deteriorating an energy absorbing function for protecting the passenger.

DISCLOSURE OF THE INVENTION

The object mentioned above of the present invention can be effectively achieved by a motor-driven power steering apparatus structured such as to assist a steering force of a steering shaft via a transmission mechanism such as a gear of a speed reduction gear or the like by a rotation force of an electric motor on the basis of a steering torque detected by a torque sensor, comprising:

a rotation angle sensor for detecting a steering state of a steering wheel, wherein a detected portion of the rotation angle sensor is provided within the speed reduction gear, and a detecting portion of the rotation angle sensor is provided in a radial direction of the steering shaft and in an outer side of a bearing in the speed reduction gear.

Further, the object mentioned above can be effectively achieved by the structure in which the detected portion is arranged in a worm wheel within the speed reduction gear, and the rotation of the worm wheel is detected by the detecting portion.

Further, the object mentioned above can be effectively achieved by the structure in which the detecting portion is mounted to a recess groove formed in any one side within the worm wheel within the speed reduction gear.

Further, the object mentioned above can be effectively achieved by the structure in which the detecting portion is arranged at a position opposing to a side surface of the detected portion, thereby detecting a magnetic or optical angle signal from the detected portion.

Further, the object mentioned above can be effectively achieved by the structure in which the detected portion is structured by a recess groove formed in any one side within the worm wheel within the speed reduction gear, and is constituted by a small gear provided in an inner peripheral surface of the recess groove.

Further, the object mentioned above can be effectively achieved by the structure in which the rotation angle sensor is constituted by an annular detected portion provided in the side surface of the worm wheel within the speed reduction gear, and a detecting portion provided at a position opposing to the detected portion.

Further, the object mentioned above can be effectively achieved by the structure in which the speed reduction gear is supported by a plurality of bearings.

DESCRIPTION OF REFERENCE NUMERALS 31 steering shaft
35 steering column
39 torsion bar
40 input shaft
41 output shaft
42 speed reduction gear unit
43 bearing
44 torque sensor
46 coil winding
47 electromagnetic yoke
48 worm wheel
49 worm
51 rotation angle sensor
52 detected portion
53 detecting portion
61 core bar boss portion
62 gear base portion
63 resin gear
64 detected portion
65 rotation angle sensor
67 detecting portion
72 detecting gear

MODE FOR CARRYING OUT THE INVENTION

A description will be given below of embodiments in accordance with the present invention with reference to the accompanying drawings.

Figure 2:
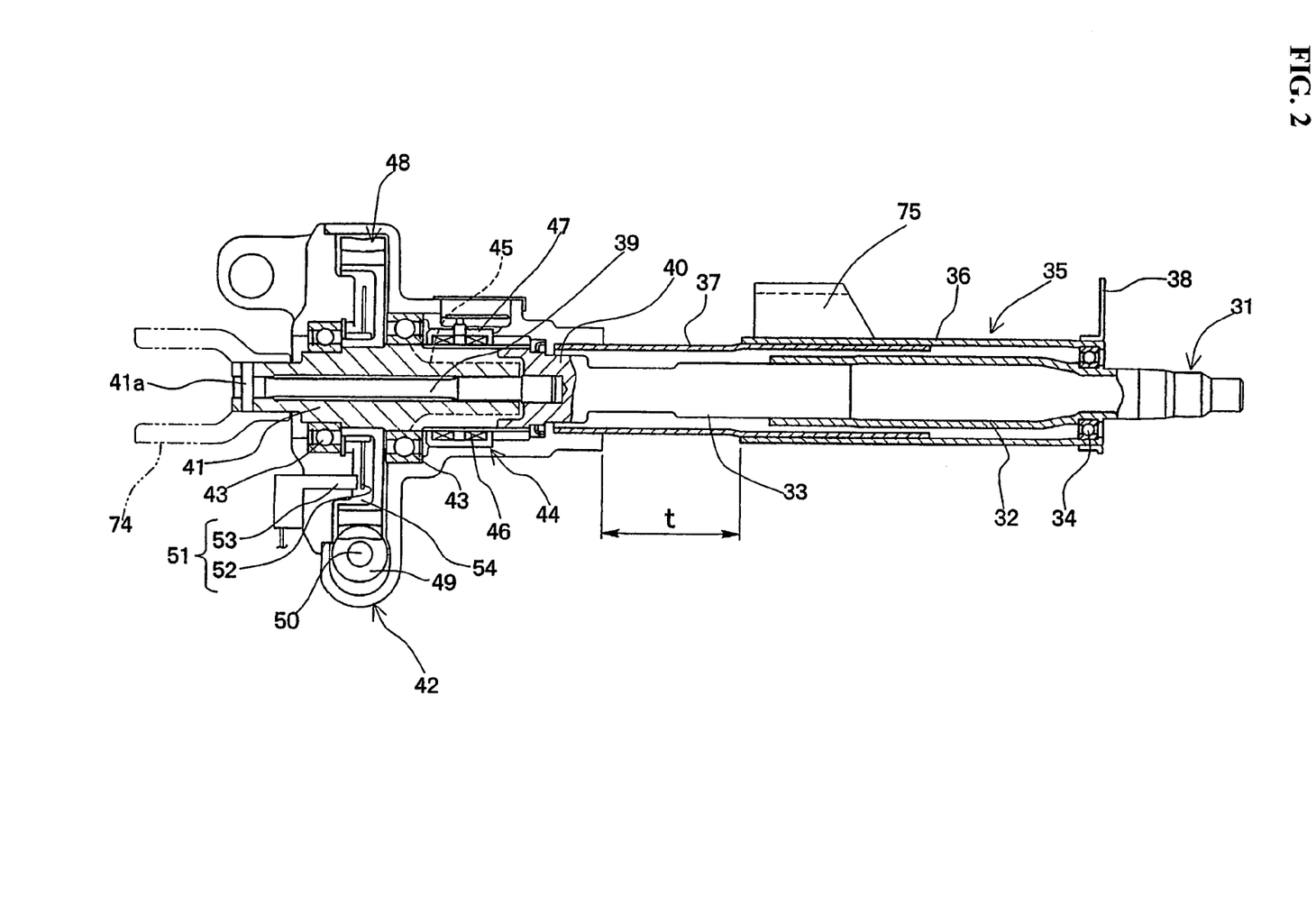
FIG. 2 is a cross sectional view showing a structure of a motor-driven power steering apparatus in accordance with a first embodiment of the present invention.

FIG. 2 shows a first embodiment of the present invention, and is a view showing an outline structure of a steering system. A steering shaft 31 rotating on the basis of an operation of a steering wheel is connecting by press fitting and fixing a solid cylindrical shaft-like inner shaft 33 to a tubular outer shaft 32. Further, the steering shaft 31 is rotatably supported at an end portion of a steering column 35 by a bearing 34 such as a deep groove type ball bearing or the like. The steering column 35 is connected by press fitting and fixing an inner column 37 to a tubular outer column 36.

The steering shaft 31 and the steering column 35 are structured such that when a great load is applied in an axial direction, the outer shaft 32 moves along the inner shaft 33 and the outer column 36 moves along the inner column 37 respectively in the axial direction within a range of the stroke t in the axial direction so as to be plastically deformed. In other words, the steering shaft 31 and the steering column 35 are both structured by combining two members 32 and 33, and 36 and 37, and forms an energy absorbing mechanism structured such as to absorb an impact applied to a body of a driver colliding with the steering wheel.

In this case, in the embodiment mentioned above, the energy of the steering shaft 31 and the steering column 35 is absorbed by a plastic deformation at a time of relative movement between two members, however, it is possible to absorb the energy by the plastic deformation between the steering column 35 and a bracket 75 for fixing the steering column 35 to the vehicle body.

Further, an input shaft 40 and an approximately cylindrical output shaft 41 are connected to a base end side (a left side in FIG. 1) of the steering shaft 31 via a torsion bar 39. The torsion bar 39 is inserted into the output shaft 41, one end thereof is press fitted and fixed to the input shaft 40, and the other end thereof is fixed to the output shaft 41 by a pin 41*a*.

Further, a speed reduction gear unit 42 is supported in an outer periphery of the output shaft 41 by a pair of ball bearings 43 and 43, and a torque sensor 44 is arranged in a leading end side (a right side in FIG. 1) of the speed reduction gear unit 42. The torque sensor 44 is provided with the torsion bar 39, and an electromagnetic yoke 47 arranged in an outer periphery of a spline groove 45 formed in a leading end of the output shaft 41 and receiving a coil winding 46, and is structured such as to detect a magnetic change by the coil winding 46 within the electromagnetic yoke 47 by generating a torsion in the torsion bar 39 in correspondence to the torque generated in the steering shaft 31.

Further, the speed reduction gear is constituted by a worm wheel 48 fixedly mounted to an outer periphery of the output shaft 41 in accordance with a press fitting, a worm 49 engaged with the worm wheel 48, and a motor mounting the worm 49 to the output shaft 50, and is structured such as to reduce a speed of the rotation of the motor via the worm 49 and the worm wheel 48 by driving the motor so as to transmit the torque.

Figure 3:
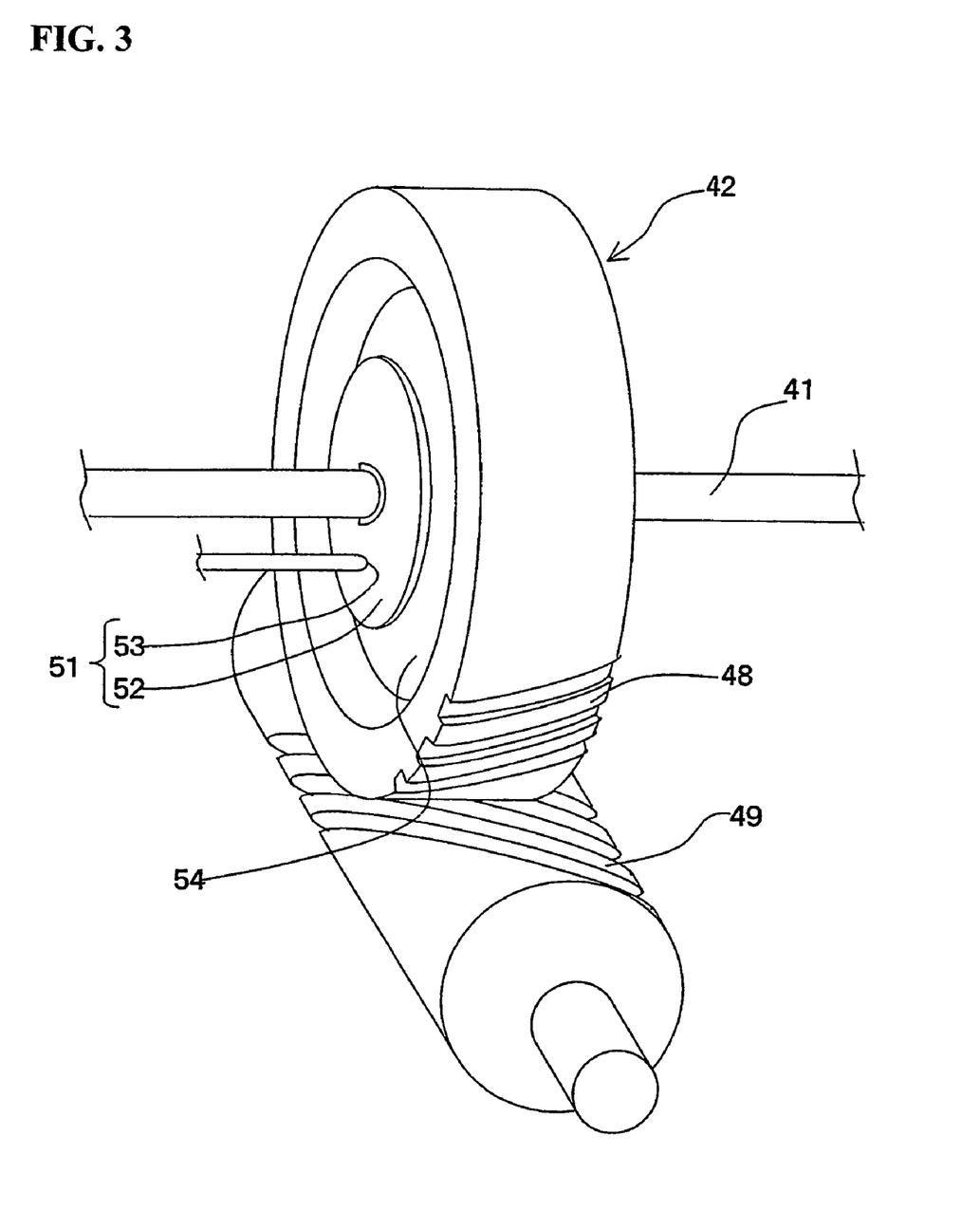
FIG. 3 is a schematic view showing a rotation angle sensor provided in a speed reduction gear unit of the motor-driven power steering apparatus.

Further, the rotation angle sensor 51 is constituted by a thin disc-like detected portion 52 provided within the speed reduction gear unit 42 and having a smaller diameter than the worm wheel 48, and the steering shaft 31, that is, a detecting portion 53 provided in an outer side of the bearing 43 in a radial direction of the output shaft 41, as shown in FIG. 3. The detecting portion 53 is arranged at a position opposing to a side surface of the detected portion 52, and is integrally mounted to the output shaft 41 within a recess groove 54 formed in any one side within the worm wheel 48. Further, the detecting portion 53 is structured such as to detect the rotation angle of the output shaft 41 by detecting an angle signal from the detected portion 52 in a magnetic manner or an optical manner, or an electric resistance manner or an electrical capacitance manner.

Accordingly, in the first embodiment mentioned above, the detected portion 52 of the rotation angle sensor 51 is provided within the speed reduction gear unit 42, and the detecting portion 53 is provided in the outer side of the ball bearing 43 in the radial direction of the output shaft 41. Accordingly, it is not necessary that the exclusive space for mounting the rotation angle sensor is provided on the steering shaft 31. As a result, it is possible to make the stroke t of the energy absorbing mechanism, that is, a distance in the axial direction by which the outer column 36 of the steering column 35 moves along the inner column 37 long. As a result, even in the case that the length in the axial direction on the steering shaft 31 is limited, such as the column type motor-driven power steering apparatus or the like, it is possible to secure a sufficient stroke t in the axial direction even if the rotation angle sensor 51 is provided in the steering shaft 31, whereby the energy absorbing capacity with respect to the impact load is not sacrificed.

Figure 4:
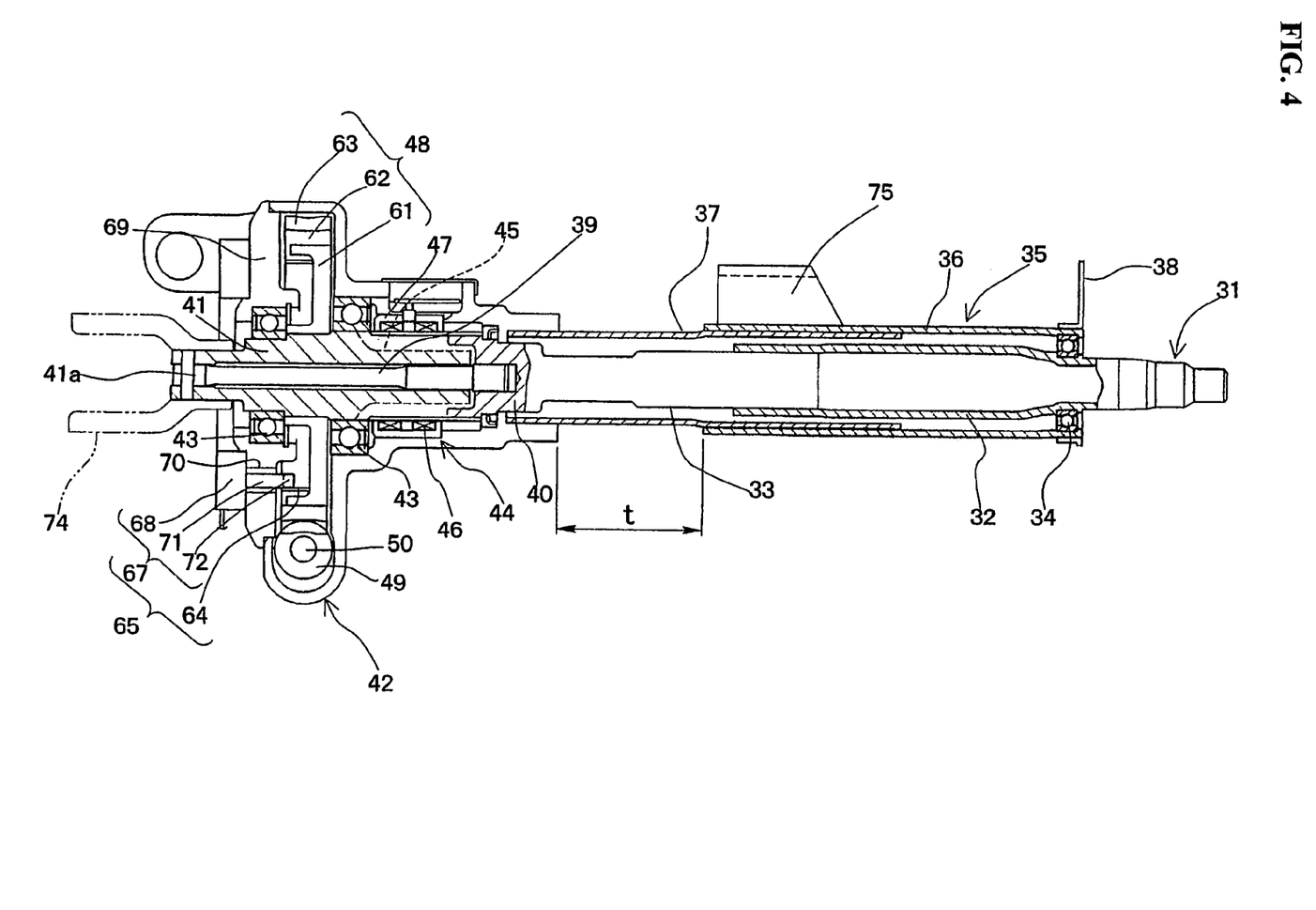
FIG. 4 is a cross sectional view showing a structure of a motor-driven power steering apparatus in accordance with a second embodiment of the present invention.
Figure 5:
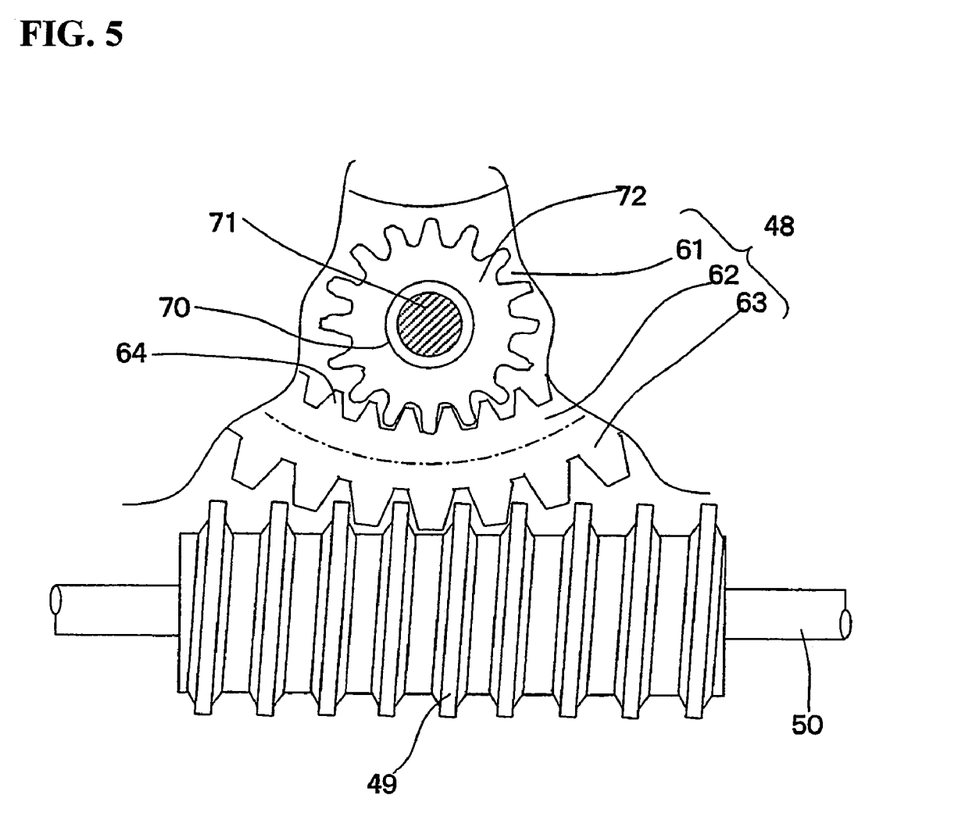
FIG. 5 is an enlarged view describing a detecting mechanism of a rotation angle of an output shaft in accordance with the second embodiment.

Further, FIG. 4 shows a second embodiment in accordance with the present invention. A description of the second embodiment will be omitted by attaching the same reference numerals as those of the first embodiment to the same members. In FIG. 4, the worm wheel 48 is constituted by an approximately ring-like core rod boss portion 61, a gear base portion 62 integrally formed in an outer peripheral side of the core rod boss portion 61 by a resin, and a resin gear 63 formed in an outer peripheral side of the gear base portion 62 and engaged with the worm 49. Further, a recess groove is formed in a left side in FIG. 4, in the worm wheel 48, and a detected portion 64 constituted by a small gear is formed within the recess groove and in an inner peripheral side of the gear base portion 62. Accordingly, a rotation angle sensor 65 of the output shaft 41 is constituted by the detected portion 64 and a detecting portion 67 for detecting the rotation of the output shaft 41. Further, the detecting portion 67 is provided with a protruding shaft 71 extending from a main body 68 arranged in an outer side of the speed reduction gear unit 42 into the speed reduction gear unit 42 via an insertion hole 70 of a housing cover 69, and a detecting gear 72 mounted to a leading end of the protruding shaft 71. Accordingly, the rotation angle sensor 65 is structured, as shown in FIG. 5 in an enlarged manner, such as to detect the rotation of the output shaft 41 by the main body 68 from the detecting gear 72 via the protruding shaft 71, in accordance with an engagement between the detecting gear 72 of the detecting portion 67 and the small gear constituting the detected portion 64.

Accordingly, the detected portion 64 of the rotation angle sensor 65 is provided within the speed reduction gear unit 42, and the detecting portion 67 is provided in the outer side of the bearing 43 of the speed reduction gear unit 42 in the radial direction of the output shaft 41. Therefore, even in the case that the rotation angle sensor 65 is provided in the steering shaft 31, it is possible to sufficiently secure the stroke t of the energy absorbing mechanism, and the energy absorbing capacity is not sacrificed. Accordingly, the same operations and effects as those of the first embodiment mentioned above can be achieved even by the second embodiment.

Figure 6:
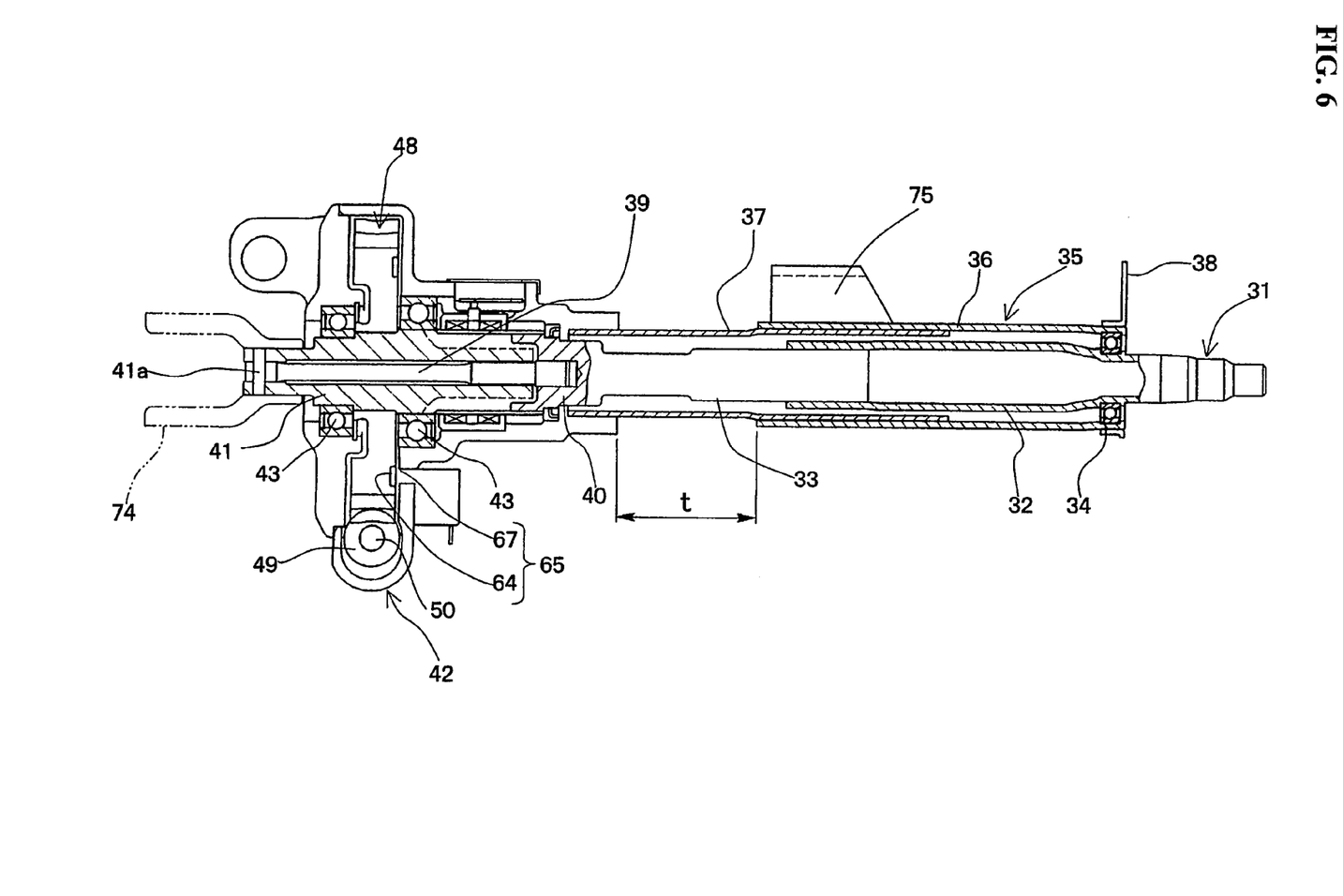
FIG. 6 is a cross sectional view showing a structure of a motor-driven power steering apparatus in accordance with a third embodiment of the present invention.
Figure 7:
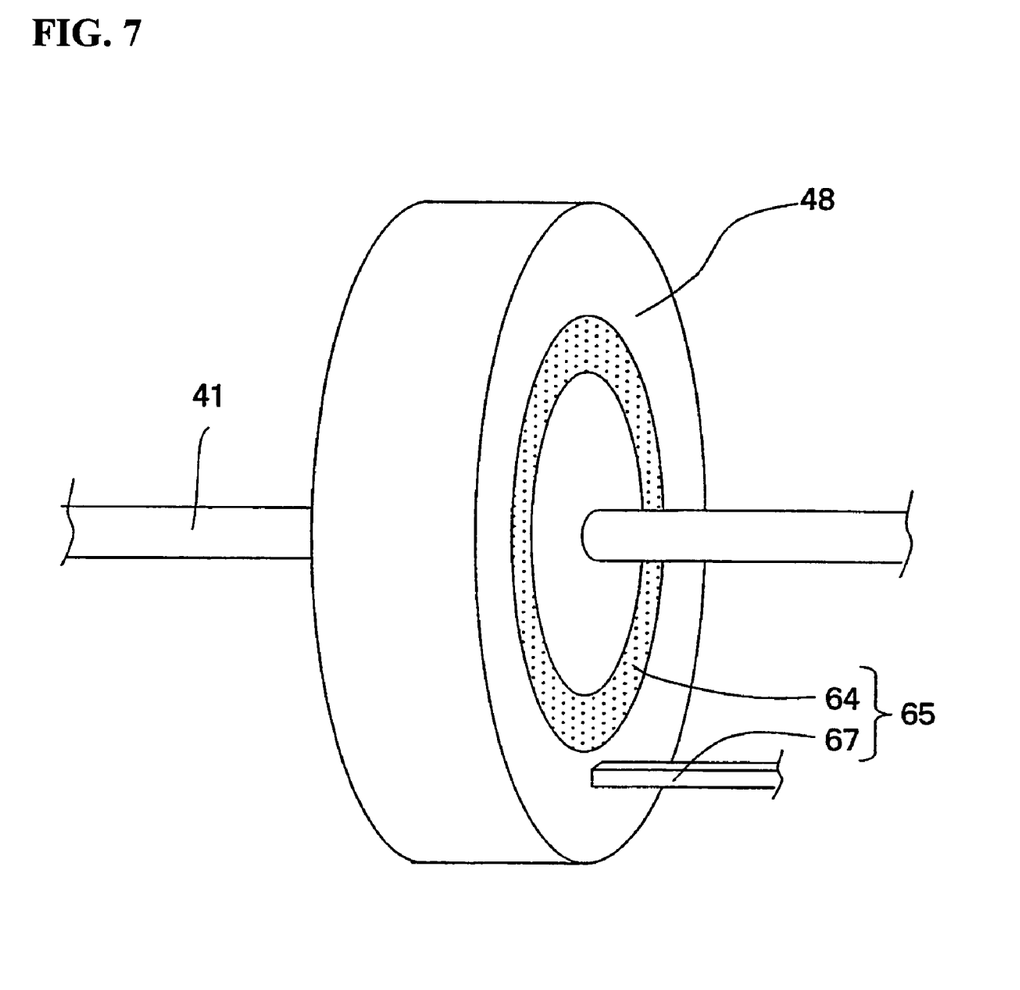
FIG. 7 is a view showing an outline structure of a rotation angle sensor in accordance with the third embodiment.

Further, FIG. 6 shows a third embodiment in accordance with the present invention. A description of the third embodiment will be omitted by attaching the same reference numerals as those of the first embodiment to the same members. In FIG. 6, the rotation angle sensor 65 is constituted by an annular detected portion 64 provided in a side surface of a leading end side (a right side in FIG. 6) of the worm wheel 48, and a detecting portion 67 provided at a position opposing to the detected portion 64, as shown in FIG. 7.

Accordingly, the detected portion 64 of the rotation angle sensor 65 is provided within the speed reduction gear unit 42, and the detecting portion 67 is provided in the outer side of the bearing 43 of the speed reduction gear unit 42 in the radial direction of the output shaft 41. Therefore, even in the case that the rotation angle sensor 65 is provided in the steering shaft 31, it is possible to sufficiently secure the stroke t of the energy absorbing mechanism, and the energy absorbing capacity is not sacrificed. Accordingly, the same operations and effects as those of the first and second embodiments mentioned above can be achieved even by the third embodiment.

In this case, in FIGS. 2, 4 and 6, reference numeral 74 denotes a universal joint for connecting to an intermediate shaft, and reference numeral 75 denotes a bracket for mounting the steering apparatus to the vehicle body.

As mentioned above, in accordance with the motor-driven power steering apparatus on the basis of the present invention, in the case that the rotation angle sensor for detecting the steering state of the steering wheel is provided, the detected portion is provided in the worm wheel or the like within the speed reduction gear, and the detecting portion is provided in the outer side of the bearing of the speed reduction gear in the radial direction of the steering shaft. Therefore, the rotation angle of the steering shaft is detected by utilizing the worm wheel of the speed reduction gear and detecting the angle signal from the detected portion provided in the worm wheel by the detecting portion while using the magnetic or optical method, or the like. As a result, it is not necessary that the exclusive space for arranging the rotation angle sensor is provided in the axial direction of the steering shaft, and it is possible to effectively utilize the stroke of the energy absorbing mechanism. Accordingly, even in the case that the rotation angle sensor is provided in the limited space in the axial direction of the steering shaft, such as the column type motor-driven power steering apparatus or the like, it is possible to keep a safety with respect to the impact load generated at a time of the collision of the vehicle or the like, without sacrificing the energy absorbing capacity.

What is claimed is:

1. A motor-driven power steering apparatus structured such as to assist a steering force of a steering shaft via a transmission mechanism by a rotation force of an electric motor on the basis of a steering torque detected by a torque sensor, comprising:

a rotation angle sensor to detect a steering state of a steering wheel, wherein a detected portion of said rotation angle sensor is provided within a speed reduction gear of said transmission mechanism, a detecting portion of said rotation angle sensor is provided in a radial direction of said steering shaft and in an outer side of a bearing in said speed reduction gear, and said detected portion is structured by a recess groove formed in any one side within a worm wheel within said speed reduction gear, and is constituted by a small gear provided in an inner peripheral surface of said recess groove.

2. A motor-driven power steering apparatus as claimed in claim 1, wherein said detecting portion comprises:

a main body arranged in an outer side of said speed reduction gear;

a protruding shaft extending from said main body into said speed reduction gear via an insertion hole of a housing cover of said speed reduction gear; and a detecting gear mounted to a leading end of said protruding shaft.

3. A motor-driven power steering apparatus as claimed in claim 1, wherein:

said worm wheel comprises: an approximately ring-shaped core rod boss portion; a gear base portion integrally formed in an outer peripheral side of said core rod boss portion by a resin; and a resin gear integrally formed in an outer peripheral side of said gear base portion and engaged with a worm mounted to an output shaft of said electric motor; and said small gear is integrally formed in an inner peripheral side of said gear base portion.

4. A motor-driven power steering apparatus as claimed in claim 1, wherein said speed reduction gear is supported by a plurality of bearings.

* * * * *